United States Patent
Beck et al.

(10) Patent No.: US 11,984,001 B2
(45) Date of Patent: May 14, 2024

(54) DEVICE TAMPER DETECTION

(71) Applicant: Lenovo (Singapore) Pte. Ltd., Singapore (SG)

(72) Inventors: Kevin Wayne Beck, Raleigh, NC (US); Russell Speight VanBlon, Raleigh, NC (US); Thorsten Peter Stremlau, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 49 days.

(21) Appl. No.: 17/557,335

(22) Filed: Dec. 21, 2021

(65) Prior Publication Data
US 2022/0114870 A1    Apr. 14, 2022

Related U.S. Application Data

(62) Division of application No. 16/274,797, filed on Feb. 13, 2019, now Pat. No. 11,222,515.

(51) Int. Cl.
| | |
|---|---|
| G08B 13/06 | (2006.01) |
| G06F 21/88 | (2013.01) |
| G08B 13/24 | (2006.01) |
| G08B 25/00 | (2006.01) |

(52) U.S. Cl.
CPC .......... *G08B 13/06* (2013.01); *G06F 21/88* (2013.01); *G08B 13/2448* (2013.01); *G08B 25/003* (2013.01); *G08B 25/007* (2013.01)

(58) Field of Classification Search
CPC ....... G08B 13/06; G08B 13/08; G08B 13/128
USPC ...................................................... 340/568.1
See application file for complete search history.

(56) References Cited

U.S. PATENT DOCUMENTS

| | | | | |
|---|---|---|---|---|
| 6,357,007 | B1 * | 3/2002 | Cromer | H04L 63/10 |
| | | | | 713/192 |
| 9,665,870 | B1 * | 5/2017 | Rezayee | G06Q 20/4012 |
| 10,127,409 | B1 * | 11/2018 | Wade | G06F 21/75 |
| 2005/0039040 | A1 * | 2/2005 | Ransom | H04L 63/0272 |
| | | | | 700/286 |
| 2017/0032151 | A1 * | 2/2017 | Sofia | G06F 21/86 |
| 2019/0318133 | A1 * | 10/2019 | Lulic | H04L 9/0894 |

* cited by examiner

*Primary Examiner* — Qutbuddin Ghulamali
(74) *Attorney, Agent, or Firm* — FERENCE & ASSOCIATES LLC

(57) ABSTRACT

One embodiment provides a method, including: identifying, using a tamper detection switch of an information handling device, a tampering event; determining, using a processor, contextual data associated with the tampering event; constructing, based on the determining, a signal comprising the contextual data; and broadcasting, using a radio transmission beacon, the signal. Other aspects are described and claimed.

10 Claims, 3 Drawing Sheets

DEVICE TAMPER DETECTION

This application is a divisional application of U.S. patent application Ser. No. 16/274,797, filed Feb. 13, 2019, the contents of which are hereby incorporated by reference as if set forth in its entirety.

BACKGROUND

Information handling devices ("devices"), for example laptop and personal computers, smart phones, tablets, televisions, other electronic devices, and the like, integrate many high-value components from a large number of suppliers during assembly. In many cases, these components are removable and/or replaceable by design for reasons of ease of assembly or later repair and/or upgrade. After assembly/integration by the original equipment manufacturer (OEM), the finished products go through multiple supply chain and logistics steps before final delivery to a retailer or consumer.

BRIEF SUMMARY

In summary, one aspect provides a method, comprising: identifying, using a tamper detection switch of an information handling device, a tampering event; recording, at a storage location, contextual data associated with the tampering event; constructing, using a processor, a signal comprising the contextual data; and broadcasting, using a radio transmission beacon, the signal.

Another aspect provides an information handling device, comprising: a tamper detection switch; a radio transmission beacon; a processor; a memory device that stores instructions executable by the processor to: identify, using the tamper detection switch, a tampering event; determine contextual data associated with the tampering event; construct a signal comprising the contextual data; and broadcast, using the radio transmission beacon, the signal.

A further aspect provides a product, comprising: a storage device that stores code, the code being executable by a processor and comprising: code that identifies a tampering event; code that determines contextual data associated with the tampering event; code that constructs a signal comprising the contextual data; and code that broadcasts the signal.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example method of identifying that a device has been tampered with.

DETAILED DESCRIPTION

Figure 1:
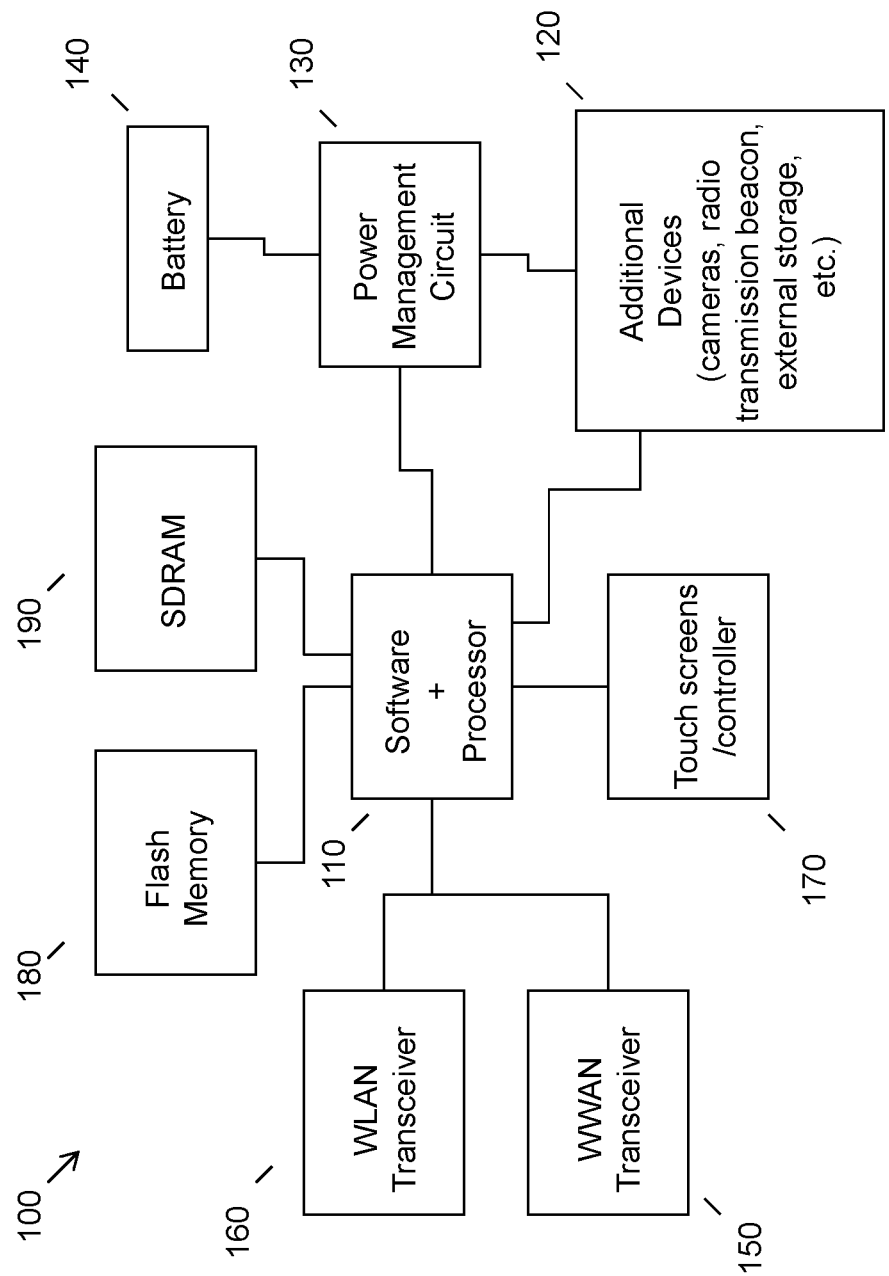
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Each supply chain step during the transit of a finished product to the consumer after assembly represents a possibility for tampering, alteration, or substitution of components in the product. Such an intrusion event may not only cause damage to the device but may also be dangerous to other individuals or entities. For example, tampering with a medical device may impair its performance, which could cause serious harm to patients. As another example, tampering with a utility meter may lead to a loss of revenue to the utility company. Accordingly, many types of electronic systems require a robust means to detect unauthorized tampering events.

Conventional solutions exist for detecting a tampering event. For instance, trusted supply chain solutions exist that allow the customer to compare a hash value of a device "as built" to a hash value "as received" to determine if tampering or substitution has occurred in transit. However, this does not provide any information about when or where the tampering, or parts substitution, occurred in transit, and requires active checking or verification by the recipient in order to determine if tampering has occurred, which is time-consuming and burdensome.

Accordingly, an embodiment may identify contextual data associated with a tampering event and thereafter broadcast this information as a signal that is detectable by another device. In an embodiment, a tamper detection switch of a device may be utilized to identify that a tampering event has occurred. An embodiment may next identify and record, at a storage location, contextual data associated with the tampering event (e.g., the time the event occurred, the date the event occurred, the location the event occurred, etc.). An embodiment may then construct a signal comprising the contextual data and thereafter broadcast the signal using a radio transmission beacon (e.g., a Bluetooth Low Energy (BLE) beacon, etc.). Such a method may allow additional information associated with a tampering event to be captured. Additionally, such a method may negate the need for the device to be opened and/or connected to a system to identify evidence of the event.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, a thermal sensor, etc. System 100 often includes one or more touch screens 170 for data input and display/rendering. System 100 also typically includes various memory devices, for example flash memory 180 and SDRAM 190.

Figure 2:
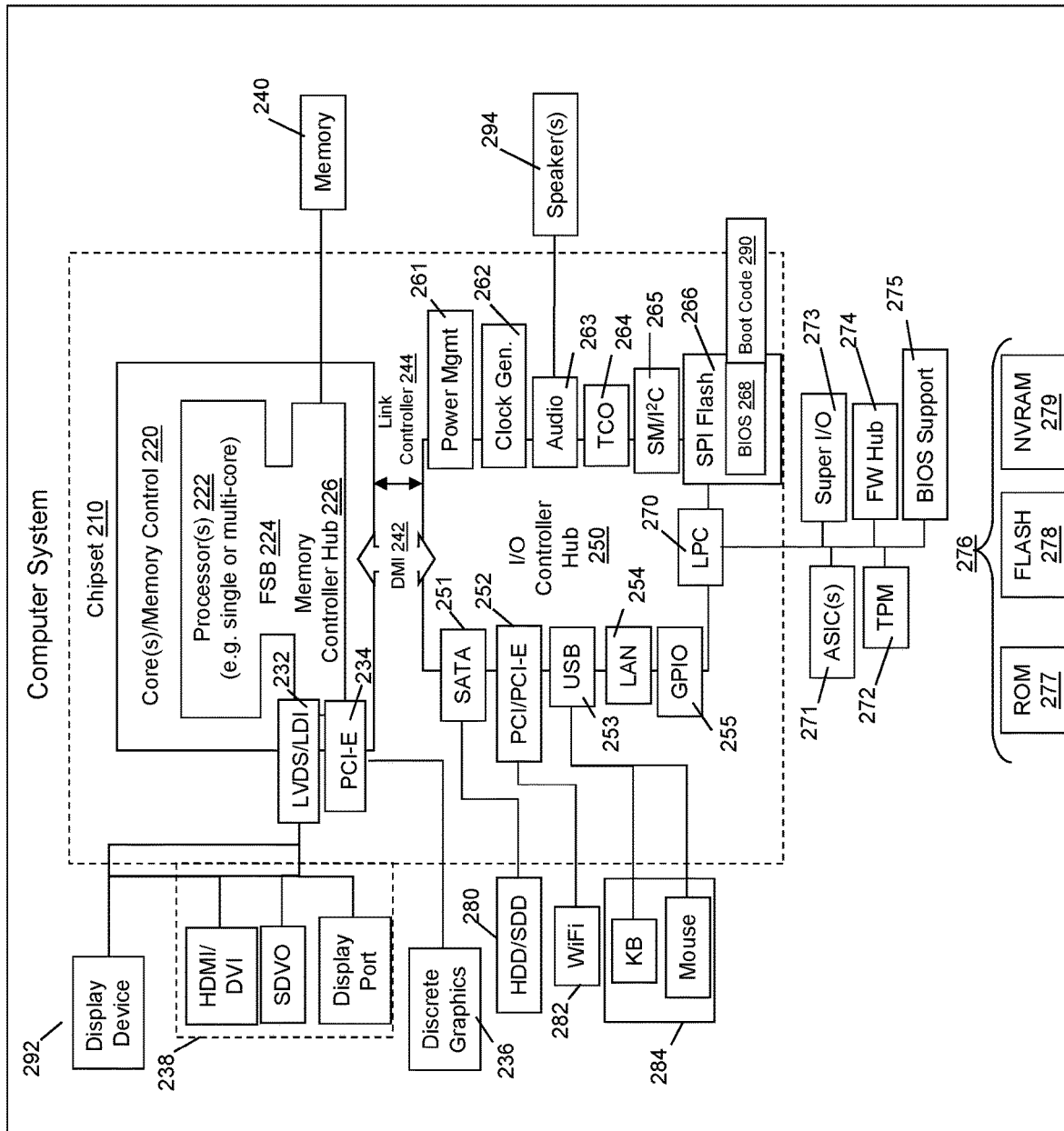
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, laptops, televisions, personal computer devices generally, and/or electronic devices that comprise a tamper detection switch. For example, the circuitry outlined in FIG. 1 may be implemented in a tablet or smart phone embodiment, whereas the circuitry outlined in FIG. 2 may be implemented in a laptop.

Figure 3:
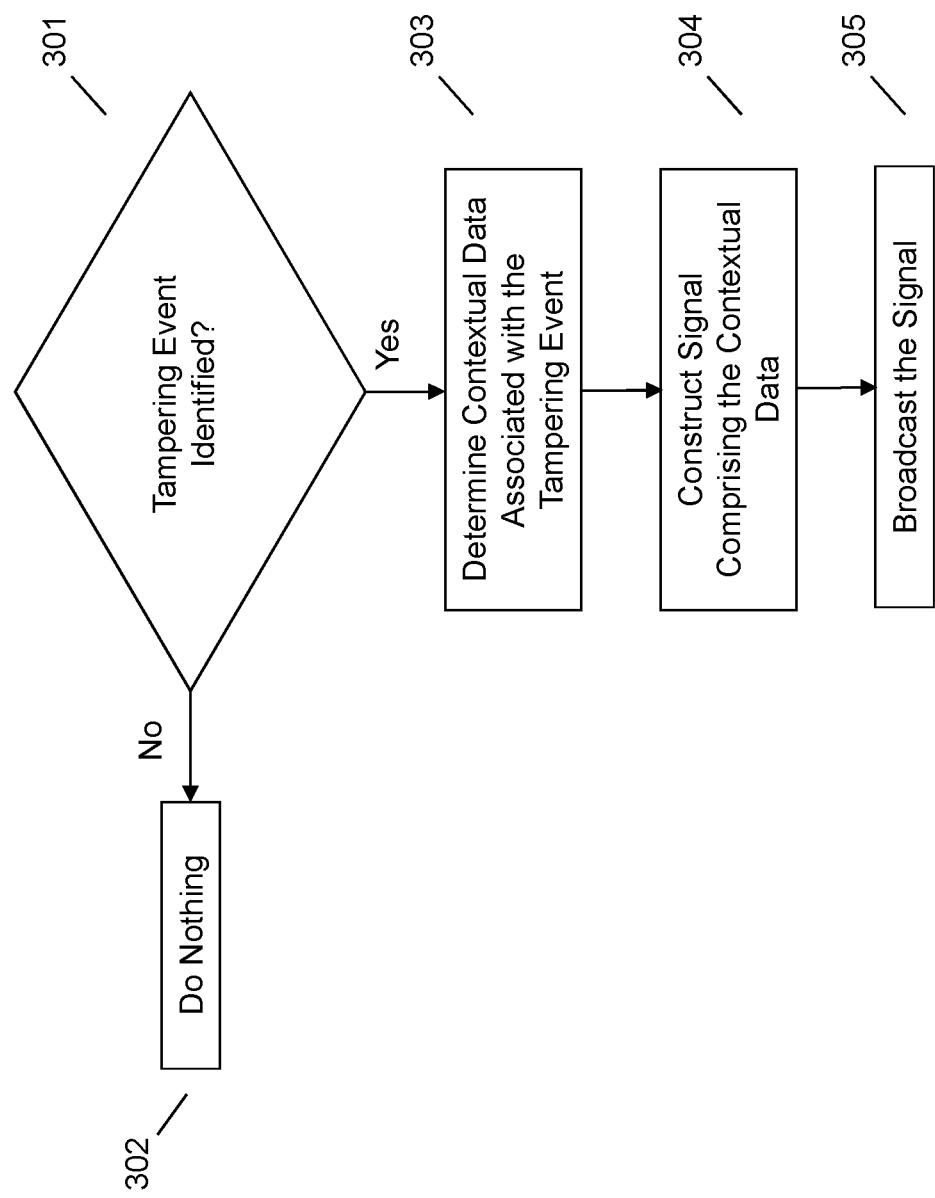

Referring now to FIG. 3, an embodiment may identify a tampering event and thereafter broadcast an indication of the event. At 301, an embodiment may identify a tampering event that occurs at a device. In the context of this application, a tampering event may be associated with the unauthorized opening of a device cover and/or the unauthorized removal or manipulation of device hardware/circuitry. The tampering event may be detected by utilizing one or more conventional tamper detection switches. These switches may be operatively coupled to device covers, circuit panels, other device hardware, and the like. An embodiment may comprise a single tamper detection switch or, alternatively, may comprise a plurality of tamper detection switches. In the case of the latter, each of the switches may be dedicated to a particular device cover, circuit panel, device hardware, etc.

In an embodiment, the tampering event may be identified responsive to the "tripping" of a switch. In an embodiment, a switch may be tripped by opening a portion of the device connected to the switch prior to an authorized time (e.g., opening a device cover during transit of the device between a manufacturer and a retailer, etc.). Additionally or alternatively, a switch may be tripped responsive to identifying that a portion of the device connected to the switch was opened inappropriately (e.g., with excessive force, without a proper key or code, etc.). In an embodiment, in a situation where there are multiple switches, the switches may be connected by a "tamper loop" in which a triggering of any of the switches provides an indication of the tampering event.

Responsive to not identifying, at 301, a tampering event, an embodiment may, at 302, take no additional action. Conversely, responsive to identifying, at 301, a tampering event, an embodiment may, at 303, determine different types of contextual data associated with the tampering event.

In an embodiment, the contextual data associated with the tampering event may be of a variety of different types. For example, one type of contextual data may be a tampering time. In the context of this application, a tampering time may be the time at which the tampering event is detected. In an embodiment, responsive to detection of the tampering event, an embodiment may obtain the tampering time (e.g., by referring to a clock application on the device, etc.) at substantially the exact time the tampering event is detected. As another example, another type of contextual data may be a tampering date. Similar to the tampering time, in the context of this application a tampering date may be the date (e.g., day, month, year, a combination thereof, etc.) that the tampering event was detected. The tampering date may be determined in much the same way as a tampering time (i.e., by referring to a date application on the device at the time the tampering event is detected).

Another type of contextual data may be a tampering location. In the context of this application, the tampering location may be a geographic location where the tampering event occurred. In an embodiment, the tampering location may be determined using one or more location determination techniques. For example, responsive to identifying a tampering event, an embodiment may be configured to obtain, using one or more Global Positioning System (GPS) receivers, position data of the device. In situations where GPS data is unavailable (e.g., when a tampering event occurs at an indoor location, etc.) an alternative location determination method may be utilized such as a Wi-Fi geolocation. A Wi-Fi geolocation system may utilize the characteristics of nearby Wi-Fi hotspots and other wireless access points to discover where a device is located. A person skilled in the art will recognize that other device location determination techniques not explicitly described here may also be utilized.

Another type of contextual data may be image data associated with the tampering event. In an embodiment, responsive to detecting a tampering event, a device may be configured to temporarily provide power to a controller that activates a camera on a device (e.g., a worldview camera, etc.). Once activated, an embodiment may be configured to utilize the camera to capture a predetermined number of images or videos. For example, an embodiment may be configured to capture a single image, multiple images at predetermined time intervals (e.g., ever 5 seconds, etc.), multiple images at different focus points, multiple images until a predetermined object is identified (e.g., a human is identified, etc.), and the like. As another example, an embodiment may be configured to capture video of a predetermined length (e.g., 30 seconds, 1 minute, etc.). In an embodiment, a device may comprise a single camera or may comprise a plurality of different cameras situated at different locations around the device. For example, a device according to the embodiments may have one camera positioned on an external top portion of the device, another on an external bottom portion, yet another on an interior cover portion, a combination thereof, and the like. In an embodiment, all of the cameras may be activated responsive to the detection of the tampering event or, alternatively, only a predetermined number of cameras may be activated. For example, an embodiment may only activate the cameras proximate to the location of the tampering event (e.g., an embodiment may activate a camera proximate to a device cover where a tampering event was detected, etc.).

Although a variety of contextual data types have previously been described, a person skilled in the art may recognize that the foregoing list of contextual data types is not limiting and other types of contextual data associated with a tampering event may also be detected and recorded. Additionally, all of the foregoing types of contextual data may be stored at a local storage location on the device (e.g., a local drive, a local configuration hash, another data store, etc.).

At 304, an embodiment may construct a signal comprising the contextual data. In an embodiment, the signal may comprise an indicator that indicates that a tamper detection event has occurred. Additionally or alternatively, the signal may comprise a copying/encoding of the contextual data. Responsive to constructing, at 304, the signal, an embodiment may, at 305, broadcast the signal. In an embodiment, the signal may be broadcast using one or more radio transmission beacons integrated into the device. In an embodiment, a low-power radio transmission beacon may be utilized such as a Bluetooth Low Energy (BLE) beacon, however, such a designation is not limiting and other types of low-power radio transmission beacons may also be utilized.

In an embodiment, the BLE devices may operate as a mesh between systems to enable all systems in a shipping batch to share and relay tamper information. More particularly, as an example, if a batch contained ten devices and a tampering event was detected at one of the devices; an embodiment may use the BLE device to communicate an indication of the tampering event to the other nine devices in the batch. In an embodiment, responsive to receiving this indication, the other devices may record and/or also transmit an indication of the tampering event. The signal transmitted by the other devices may comprise data indicating that a tampering event for another device in the batch was detected so the resident device should be checked prior to further progression down the supply chain.

In an embodiment, the signal may be broadcast until an indication is detected by the device that the signal was received by another device. For example, an embodiment may continue to broadcast the signal until a receipt transmission is returned to the device by another device (e.g., a scanning device, etc.). In an embodiment, a device may be configured to transmit the data to a predetermined location (e.g., a predetermined device, a predetermined server, etc.). For example, an embodiment may transmit the data to a device of a known owner, the device of a transit operator/overseer; the device of a legal authority (e.g., the police, etc.), another authorized party, etc.

In an embodiment, the contextual data may be broadcast using another transmission technique. For example, an embodiment may establish a wireless network connection (e.g., a WWAN connection, WLAN connection, etc.) and, responsive to the establishment, broadcast the contextual data through the wireless network. An embodiment may be configured to establish the wireless network connection at a predetermined time (e.g., when an available wireless network connection is detected, the next time the device is powered on, etc.).

The various embodiments described herein thus represent a technical improvement to conventional tamper detection techniques. Using the techniques described herein, an embodiment may first identify a tampering event for a device. An embodiment may thereafter determine contextual data associated with the tampering event (e.g., tampering time, tampering date, tampering location, etc.) and store the contextual data at an accessible data storage location. Next, an embodiment may construct a signal comprising the contextual data and thereafter broadcast the signal using a radio transmission beacon. Such a method may allow an authorized recipient of the device to determine that tampering has occurred without powering on the device. Additionally, such a method may allow the authorized recipient to compare the time/date/location data against the logs a logistics/supply chain flow of the system to determine where in transit the tampering occurred, thereby enabling the authorized recipient to determine the custody owner at the time of the tampering.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A product, comprising:
a computer-readable storage device that stores executable code that, when executed by a processor, causes the product to:
code that identifies, during a point between an origin location and a destination location, a tampering event for an information handling device, wherein the information handling device is part of a batch containing one or more other information handling devices;
code that determines contextual data associated with the tampering event;
code that constructs a signal comprising the contextual data; and
code that broadcasts the signal to at least one of the one or more other information handling devices in the batch.

2. The product of claim 1, wherein the radio transmission beacon is a Bluetooth Low Energy (BLE) beacon.

3. The product of claim 1, wherein the contextual data comprises at least one of: a tampering time, a tampering date, and a tampering location.

4. The product of claim 3, wherein the tampering location is determined using Global Positioning System (GPS) data.

5. The product of claim 1, further comprising:
code that establishes a wireless network connection; and
code that transmits, using the wireless network connection, the contextual data to a predetermined location.

6. The product of claim 5, wherein the code that establishes comprising establishing the wireless network connection responsive to identifying an available wireless network connection.

7. The product of claim 1, wherein the code that broadcasts comprises broadcasting while the information handling device is in an off state.

8. The product of claim 1, wherein the contextual data is stored at an accessible storage location on the device.

9. The product of claim 1, further comprising:
   code that activates, responsive to identifying the tampering event, an image capture device of the information handling device; and
   code that captures, using the image capture device, at least one worldview image at the time of the tampering event.

10. The product of claim 1, wherein the code that broadcasts comprises broadcasting the signal until an indication is received that the signal was detected by another device.

* * * * *